United States Patent
Tripathy et al.

(10) Patent No.: US 11,847,642 B2
(45) Date of Patent: Dec. 19, 2023

(54) SECURE COMMUNICATION OF DATA DURING TRANSACTIONS ACROSS MULTIPLE TRANSACTION ENTITIES IN DATABASE SYSTEMS

(71) Applicant: Salesforce, Inc., San Francisco, CA (US)

(72) Inventors: Manasa Ranjan Tripathy, Telangana (IN); Ravi Shankar, Telangana (IN)

(73) Assignee: Salesforce, Inc., San Francisco, CA (US)

( * ) Notice: Subject to any disclaimer, the term of this patent is extended or adjusted under 35 U.S.C. 154(b) by 404 days.

(21) Appl. No.: 16/915,571

(22) Filed: Jun. 29, 2020

(65) Prior Publication Data

US 2021/0334797 A1   Oct. 28, 2021

(30) Foreign Application Priority Data

Apr. 24, 2020   (IN) ............................. 202041017585

(51) Int. Cl.
*G06Q 20/00* (2012.01)
*G06Q 20/38* (2012.01)
*G06F 21/62* (2013.01)

(52) U.S. Cl.
CPC ..... *G06Q 20/3829* (2013.01); *G06F 21/6254* (2013.01); *G06Q 20/385* (2013.01)

(58) Field of Classification Search
CPC ............. G06Q 20/3829; G06Q 20/385; G06Q 20/027; G06Q 20/401; G06F 21/6254; G06F 21/6263

USPC .......................... 705/16, 21, 59; 380/44, 262
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |

(Continued)

*Primary Examiner* — Dante Ravetti
(74) *Attorney, Agent, or Firm* — Kwan & Olynick LLP

(57) ABSTRACT

In accordance with embodiments, there are provided mechanisms and methods for facilitating secure communication of data during transactions across multiple transaction entities in database systems according to one embodiment. In one embodiment and by way of example, a method includes receiving a request to facilitate a financial transaction, wherein the request is received from an external computing device and includes sensitive data and one or more transient keys associated with a user, and selecting a gateway from multiple gateways to facilitate performance of the financial transaction, where the gateway is selected based on participation in securing of the sensitive data. The method may further include replacing, based on the one or more transient keys, the sensitive data with substitute data that is unique to the user, and communicating the substitute data to a gateway adapter to generate a file for the gateway, where the substitute data is communicated in lieu of the sensitive data, and converting the substitute data into the sensitive data.

18 Claims, 8 Drawing Sheets

(56) References Cited

U.S. PATENT DOCUMENTS

| | | |
|---|---|---|
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,289,976 B2 | 10/2007 | Kihneman et al. |
| 7,340,411 B2 | 3/2008 | Cook |
| 7,620,655 B2 | 11/2009 | Larsson et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2009/0177744 A1 | 7/2009 | Marlow et al. |
| 2013/0086153 A1* | 4/2013 | Vendrow ............... H04L 67/141 709/203 |
| 2015/0026037 A1* | 1/2015 | Thompson ............. G06Q 40/03 705/38 |

* cited by examiner

SECURE COMMUNICATION OF DATA DURING TRANSACTIONS ACROSS MULTIPLE TRANSACTION ENTITIES IN DATABASE SYSTEMS

CROSS-REFERENCE

This patent application is related to and, under 35 U.S.C. 119, claims the benefit of and priority to India Provisional Application No. 202041017585, entitled HANDLING SENSITIVE DATA BASED ON APPLICATION PROGRAMMING INTERFACE REQUESTS ACROSS MULTIPLE LAYERS OF INTEGRATION IN DATABASE SYSTEMS, by Manasa Ranjan Tripathy, et al., filed Apr. 24, 2020, where the contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

One or more implementations relate generally to data management; more specifically, to facilitate secure communication of data during transactions across multiple transaction entities in database systems.

BACKGROUND

Conventional data management techniques lack proper security of sensitive data during financial transactions between various entities and often leading to dumping of sensitive information in logs in plain text format, storing information against user requests, and giving access to unauthorized users, applications, systems, and/or the like.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request. The secure and efficient retrieval of accurate information and subsequent delivery of this information to the user system has been and continues to be a goal of administrators of database systems. Unfortunately, conventional database approaches are associated with various limitations.

BRIEF DESCRIPTION OF THE DRAWINGS

In the following drawings like reference numbers are used to refer to like elements. Although the following figures depict various examples, one or more implementations are not limited to the examples depicted in the figures.

SUMMARY

Figure 1:
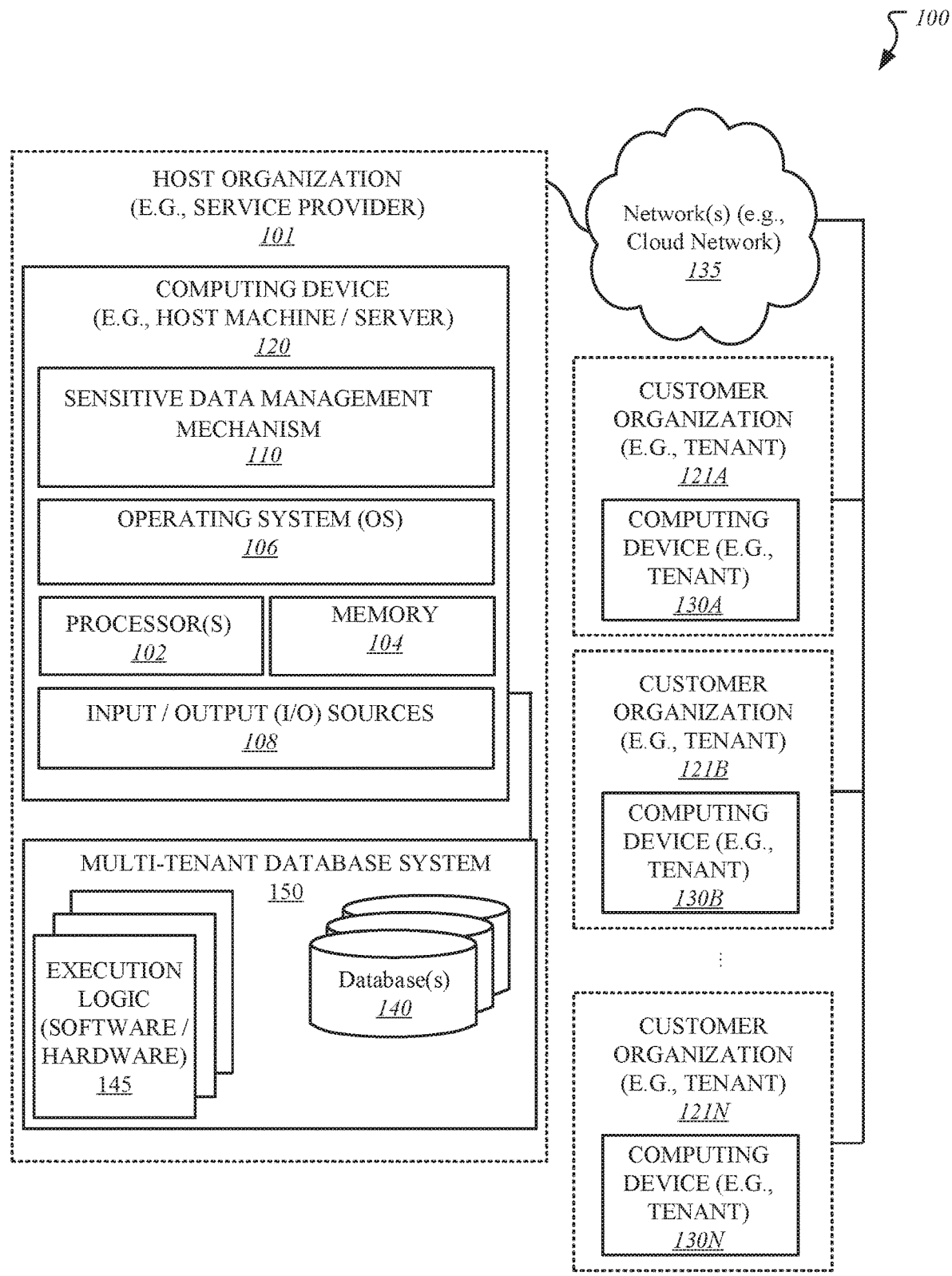
FIG. 1 illustrates a system having a computing device employing a sensitive data management mechanism according to one embodiment.

In accordance with embodiments, there are provided mechanisms and methods for facilitating secure communication of data during transactions across multiple transaction entities in database systems according to one embodiment. In one embodiment and by way of example, a method includes receiving a request to facilitate a financial transaction, wherein the request is received from an external computing device and includes sensitive data and one or more transient keys associated with a user, and selecting a gateway from multiple gateways to facilitate performance of the financial transaction, where the gateway is selected based on participation in securing of the sensitive data. The method may further include replacing, based on the one or more transient keys, the sensitive data with substitute data that is unique to the user, and communicating the substitute data to a gateway adapter to generate a file for the gateway, where the substitute data is communicated in lieu of the sensitive data, and converting the substitute data into the sensitive data.

While the present invention is described with reference to an embodiment in which techniques for facilitating management of data in an on-demand services environment are implemented in a system having an application server providing a front end for an on-demand database service capable of supporting multiple tenants, the present invention is not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

DETAILED DESCRIPTION

In the following description, numerous specific details are set forth. However, embodiments of the invention may be practiced without these specific details. In other instances, well-known circuits, structures, and techniques have not been shown in detail in order not to obscure the understanding of this description.

Embodiments provide for a technique for shielding sensitive data associated with customers/users during financial transactions (such as receiving and sending funds) with multiple and disparate gateways, while using various techniques and entities such that any intentional or unintentional unauthorized access or use of the sensitive data is prevented. These financial transactions may be based on any type of personal and/or business transactions, such as using personal credit cards, merchant credit cards, debit cards, etc.

It is contemplated that embodiments and their implementations are not merely limited to multi-tenant database system ("MTDBS") and can be used in other environments, such as a client-server system, a mobile device, a personal computer ("PC"), a web services environment, etc. However, for the sake of brevity and clarity, throughout this document, embodiments are described with respect to a multi-tenant database system, such as Salesforce.com®, which is to be regarded as an example of an on-demand services environment. Other on-demand services environments include Salesforce® Exact Target Marketing Cloud™.

As used herein, a term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

In one embodiment, a multi-tenant database system utilizes tenant identifiers (IDs) within a multi-tenant environment to allow individual tenants to access their data while preserving the integrity of other tenant's data. In one embodiment, the multitenant database stores data for multiple client entities each identified by a tenant ID having one or more users associated with the tenant ID. Users of each of multiple client entities can only access data identified by a tenant ID associated with their respective client entity. In one embodiment, the multitenant database is a hosted database provided by an entity separate from the client entities, and provides on-demand and/or real-time database service to the client entities.

A tenant includes a group of users who share a common access with specific privileges to a software instance. A multi-tenant architecture provides a tenant with a dedicated share of the software instance typically including one or more of tenant specific data, user management, tenant-specific functionality, configuration, customizations, non-functional properties, associated applications, etc. Multi-tenancy contrasts with multi-instance architectures, where separate software instances operate on behalf of different tenants.

Embodiments are described with reference to an embodiment in which techniques for facilitating management of data in an on-demand services environment are implemented in a system having an application server providing a front end for an on-demand database service capable of supporting multiple tenants, embodiments are not limited to multi-tenant databases nor deployment on application servers. Embodiments may be practiced using other database architectures, i.e., ORACLE®, DB2® by IBM and the like without departing from the scope of the embodiments claimed.

FIG. 1 illustrates a system 100 having a computing device 120 employing a sensitive data management mechanism 110 according to one embodiment. In one embodiment, sensitive data management mechanism 110 provides for a novel technique for facilitating management and security of sensitive data during financial transactions in database systems.

As illustrated, in one embodiment, computing device 120, being part of host organization 101 (e.g., service provider, such as Salesforce.com®), represents or includes a server computer acting as a host machine for sensitive data management mechanism 110 for facilitating creating and using an intelligent data-loader for facilitating efficient bulk loading/inserting of data records in a multi-tiered, multi-tenant, on-demand services environment.

It is to be noted that terms like "queue message", "job", "query", "request" or simply "message" may be referenced interchangeably and similarly, terms like "job types", "message types", "query type", and "request type" may be referenced interchangeably throughout this document. It is to be further noted that messages may be associated with one or more message types, which may relate to or be associated with one or more customer organizations, such as customer organizations 121A, 121B, 121N, where, as aforementioned, throughout this document, "customer organizations" may be referred to as "tenants", "customers", or simply "organizations". An organization, for example, may include or refer to (without limitation) a business (e.g., small business, big business, etc.), a company, a corporation, a non-profit entity, an institution (e.g., educational institution), an agency (e.g., government agency), etc.), etc., serving as a customer or client of host organization 101 (also referred to as "service provider" or simply "host"), such as Salesforce.com®, serving as a host of sensitive data management mechanism 110.

Similarly, the term "user" may refer to a system user, such as (without limitation) a software/application developer, a system administrator, a database administrator, an information technology professional, a program manager, product manager, etc. The term "user" may further refer to an end-user, such as (without limitations) one or more of tenants or customer organizations 121A-N and/or their representatives (e.g., individuals or groups working on behalf of one or more of customer organizations 121A-N), such as a salesperson, a sales manager, a product manager, an accountant, a director, an owner, a president, a system administrator, a computer programmer, an information technology ("IT") representative, etc.

Computing device 120 may include (without limitations) server computers (e.g., cloud server computers, etc.), desktop computers, cluster-based computers, set-top boxes (e.g., Internet-based cable television set-top boxes, etc.), etc. Computing device 120 includes an operating system ("OS") 106 serving as an interface between one or more hardware/physical resources of computing device 120 and one or more client devices 130A, 130B, 130N, etc. Computing device 120 further includes processor(s) 102, memory 104, input/ output ("I/O") sources 108, such as touchscreens, touch panels, touch pads, virtual or regular keyboards, virtual or regular mice, etc.

In one embodiment, host organization 101 may employ a production environment that is communicably interfaced with client devices 130A-N through host organization 101. Client devices 130A-N may include (without limitation) customer organization-based server computers, desktop computers, laptop computers, mobile computing devices, such as smartphones, tablet computers, personal digital assistants, e-readers, media Internet devices, smart televisions, television platforms, wearable devices (e.g., glasses, watches, bracelets, smartcards, jewelry, clothing items, etc.), media players, global positioning system-based navigation systems, cable setup boxes, etc. In some embodiments, client devices 130A-include artificially intelligent devices, such as autonomous machines including (without limitations) one or more of autonomous vehicles, drones, robots, smart household appliances, smart equipment, etc.

In one embodiment, the illustrated multi-tenant database system 150 includes database(s) 140 to store (without limitation) information, relational tables, datasets, and underlying database records having tenant and user data therein on behalf of customer organizations 121A-N (e.g., tenants of multi-tenant database system 150 or their affiliated users). In alternative embodiments, a client-server computing architecture may be utilized in place of multi-tenant database system 150, or alternatively, a computing grid, or a pool of work servers, or some combination of hosted computing architectures may be utilized to carry out the computational workload and processing that is expected of host organization 101.

The illustrated multi-tenant database system 150 is shown to include one or more of underlying hardware, software, and logic elements 145 that implement, for example, database functionality and a code execution environment within host organization 101. In accordance with one embodiment, multi-tenant database system 150 further implements databases 140 to service database queries and other data interactions with the databases 140. In one embodiment, hardware, software, and logic elements 145 of multi-tenant database system 130 and its other elements, such as a distributed file store, a query interface, etc., may be separate and distinct from customer organizations (121A, 121B, 121N) which utilize the services provided by host organization 101 by communicably interfacing with host organization 101 via network(s) 135 (e.g., cloud network, the Internet, etc.). In such a way, host organization 101 may implement on-demand services, on-demand database services, cloud computing services, etc., to subscribing customer organizations 121A-121N.

In some embodiments, host organization 101 receives input and other requests from a plurality of customer organizations 121A-N over one or more networks 135; for example, incoming search queries, database queries, application programming interface ("API") requests, interactions with displayed graphical user interfaces and displays at client devices 130A-N, or other inputs may be received from customer organizations 121A-N to be processed against multi-tenant database system 150 as queries via a query interface and stored at a distributed file store, pursuant to which results are then returned to an originator or requestor, such as a user of client devices 130A-N at any of customer organizations 121A-N.

As aforementioned, in one embodiment, each customer organization 121A-N is an entity selected from a group consisting of a separate and distinct remote organization, an organizational group within host organization 101, a business partner of host organization 101, a customer organization 121A-N that subscribes to cloud computing services provided by host organization 101, etc.

In one embodiment, requests are received at, or submitted to, a web server within host organization 101. Host organization 101 may receive a variety of requests for processing by host organization 101 and its multi-tenant database system 150. For example, incoming requests received at the web server may specify which services from host organization 101 are to be provided, such as query requests, search request, status requests, database transactions, graphical user interface requests and interactions, processing requests to retrieve, update, or store data on behalf of one of customer organizations 121A-N, code execution requests, and so forth. Further, the web-server at host organization 101 may be responsible for receiving requests from various customer organizations 121A-N via network(s) 135 on behalf of the query interface and for providing a web-based interface or other graphical displays to one or more end-user client devices 130A-N or machines originating such data requests.

Further, host organization 101 may implement a request interface via the web server or as a stand-alone interface to receive requests packets or other requests from the client devices 130A-N. The request interface may further support the return of response packets or other replies and responses in an outgoing direction from host organization 101 to one or more client devices 130A-N.

It is to be noted that any references to software codes, data and/or metadata (e.g., Customer Relationship Management ("CRM") data and/or metadata, etc.), tables (e.g., custom object table, unified index tables, description tables, etc.), computing devices (e.g., server computers, desktop computers, mobile computers, such as tablet computers, smartphones, etc.), software development languages, applications, and/or development tools or kits (e.g., Force.com®, Force.com Apex™ code, JavaScript™, jQuery™, Developerforce™, Visualforce™, Service Cloud Console Integration Toolkit™ ("Integration Toolkit" or "Toolkit"), Platform on a Service™ ("PaaS"), Chatter® Groups, Sprint Planner®, MS Project®, etc.), domains (e.g., Google®, Facebook®, LinkedIn®, Skype®, etc.), etc., discussed in this document are merely used as examples for brevity, clarity, and ease of understanding and that embodiments are not limited to any particular number or type of data, metadata, tables, computing devices, techniques, programming languages, software applications, software development tools/kits, etc.

It is to be noted that terms like "node", "computing node", "server", "server device", "cloud computer", "cloud server", "cloud server computer", "machine", "host machine", "device", "computing device", "computer", "computing system", "multi-tenant on-demand data system", and the like, may be used interchangeably throughout this document. It is to be further noted that terms like "code", "software code", "application", "software application", "program", "software program", "package", "software code", "code", and "software package" may be used interchangeably throughout this document. Moreover, terms like "job", "input", "request", and "message" may be used interchangeably throughout this document.

Figure 2:
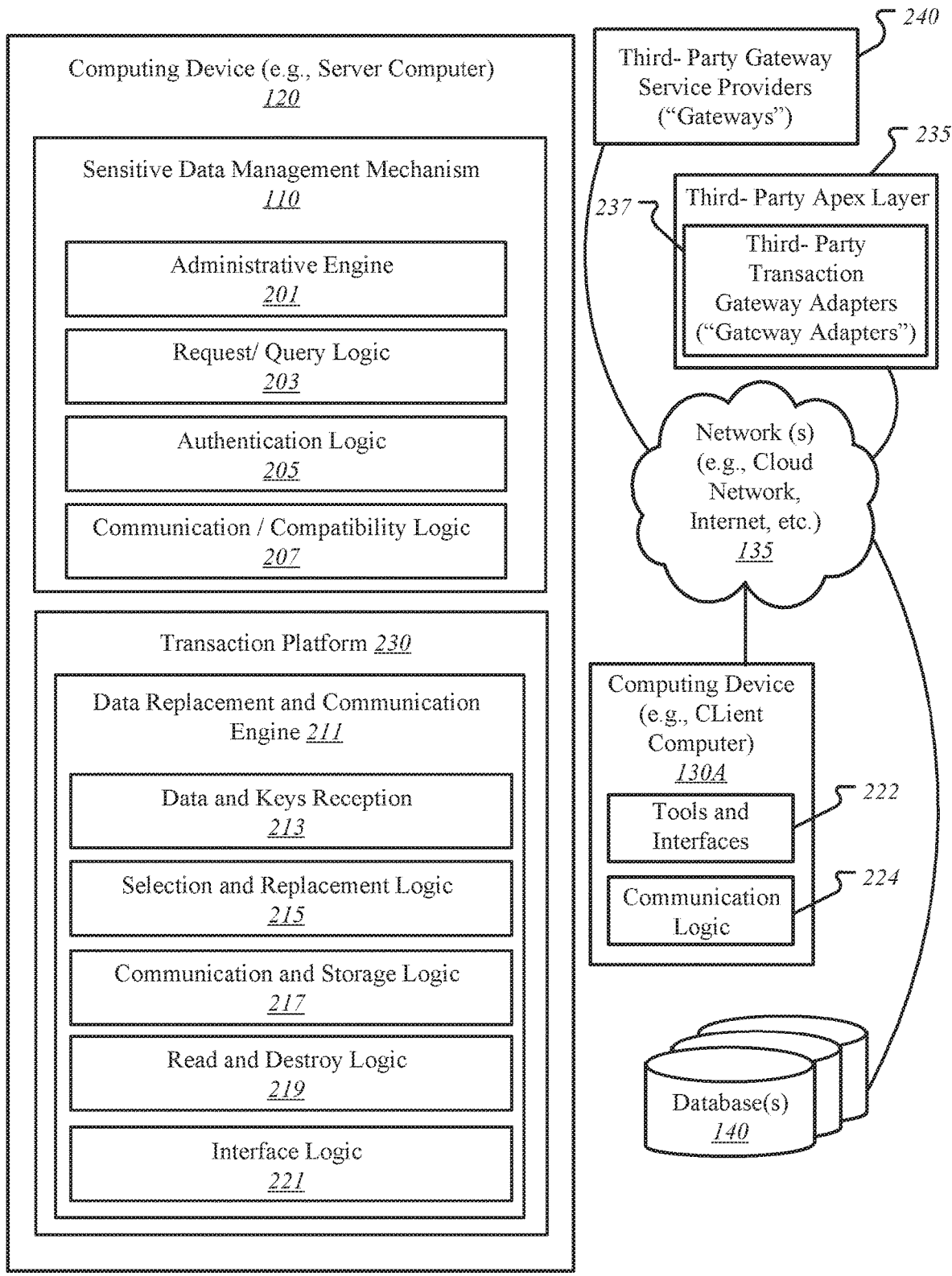
FIG. 2 illustrates the sensitive data management mechanism of FIG. 1 according to one embodiment.

FIG. 2 illustrates sensitive data management mechanism 110 of FIG. 1 according to one embodiment. In one embodiment, sensitive data management mechanism 110 provides for facilitating management and security of sensitive data associated with users and/or tenants (e.g., organizations) during performance of transactions, such as financial transactions, in multi-tenant database systems, where sensitive data management mechanism 110 includes any number and type of components, such as administration engine 201 having (without limitation): request/query logic 203; authentication logic 205; and communication/compatibility logic 207. Similarly, sensitive data management mechanism 110 may further include data replacement and communication engine 211 including (without limitations): data and key reception logic 213; selection and replacement logic 215; communication and storage logic 217; read and destroy logic 219; and interface logic 221.

In one embodiment, computing device 120 may serve as a service provider core (e.g., Salesforce.com® core) for hosting and maintaining sensitive data management mechanism 110 and be in communication with one or more database(s) 140, client computer 130A, over one or more network(s) 135, and any number and type of dedicated nodes. In one embodiment, one or more database(s) 140 may be used to host, hold, or store data including interface details, API documentation, tool information, menus, objects, tables, code samples, HTTP client data, messages, queries, tenant and organization data, etc.

As will be further described in this document, computing device 120 serves as a data management and security server computer that offers or supports or serves as platform interface (supported by a service provider, such as Salesforce.com®), such as transaction platform 230, in communication with client computing device 130A and database(s) 140 over one or more network(s) 135 (e.g., cloud network, Internet, etc.). As will be further described in this document, this transaction platform 230 may be a cloud-based transaction platform that servers as a payment platform having its own business logic core and serving as an intermediary between client devices, such as client device 130A, and server computer 120.

As illustrated, cloud-based transaction platform 230 is further in communication with third-party apex layer ("apex layer") 235 having any number and type of transaction gateway adapters 237 (e.g., payment gateway adapters) and any number and type of third-party transaction gateway service providers ("transaction gateways" or simply "gateways") 240 (e.g., payment gateways) to provide a complete nexus between one or more users having access to client device 130A and one or more gateways 240.

In one embodiment, client devices, such as client device 130A, allow for a user to place queries, make financial transactions (e.g., credit card transactions), access information, etc., using one or more user interfaces as facilitated by tools and interfaces 222, where the user interface may serve as a layer above and associated with API(s) provided by a service provider (e.g., Salesforce.com®). As illustrated, client device 130A is shown as employing tools and interfaces 222, and communication logic 224.

Throughout this document, terms like "framework", "mechanism", "engine", "logic", "component", "module", "tool", "builder", "circuit", and "circuitry", may be referenced interchangeably and include, by way of example, software, hardware, firmware, or any combination thereof. Further, any use of a particular brand, word, or term, such as "query", "data", "images", "videos", "product", "description", "detail", "sensitive data", "personal data", "user data", "non-sensitive data", "transactional data", "substitute data", "proxy data", "transaction", "transient key", "encryption", "decryption", "crypto libraries", "application programming interface", "API request", "user interface", "pluggable architecture", "integration layer", "dependency", "dependency layer", "sending payment", "receiving payment", "facilitating transaction", "identifying", "detecting", "scanning", "replacing", "secure storage", "replacement service", "read and destroy", "gateway", "gateway adapter", "apex layer", "sales cloud", "code", "metadata", "business software", "application", "database servers", "metadata mapping", "database", "detecting", "gathering", "identifying", "generating", "merging", "associating", "calculating", "computing", "determining", "classifying", "application programming interface", "API", "user interface", etc., should not be read to limit embodiments to software or devices that carry that label in products or in literature external to this document.

As aforementioned, with respect to FIG. 1, any number and type of requests and/or queries may be received at or submitted to request/query logic 203 for processing. For example, incoming requests may specify which services from computing device 120 are to be provided, such as query requests, search request, status requests, database transactions, graphical user interface requests and interactions, processing requests to retrieve, update, or store data, etc., on behalf of client device 130A, code execution requests, and so forth.

In one embodiment, computing device 120 may implement request/query logic 203 to serve as a request/query interface via a web server or as a stand-alone interface to receive requests packets or other requests from the client device 130A. The request interface may further support the return of response packets or other replies and responses in an outgoing direction from computing device 120 to one or more client device 130A.

Similarly, request/query logic 203 may serve as a query interface to provide additional functionalities to pass queries from, for example, a web service into the multi-tenant database system for execution against database(s) 140 and retrieval of customer data and stored records without the involvement of the multi-tenant database system or for processing search queries via the multi-tenant database system, as well as for the retrieval and processing of data maintained by other available data stores of the host organization's production environment. Further, authentication logic 205 may operate on behalf of the host organization, via computing device 120, to verify, authenticate, and authorize, user credentials associated with users attempting to gain access to the host organization via one or more client device 130A.

In one embodiment, computing device 120 may include a server computer which may be further in communication with one or more databases or storage repositories, such as database(s) 140, which may be located locally or remotely over one or more networks, such as network(s) 135 (e.g., cloud network, Internet, proximity network, intranet, Internet of Things ("IoT"), Cloud of Things ("CoT"), etc.). Computing device 120 is further shown to be in communication with any number and type of other computing devices, such as client device 130A, over one or more communication mediums, such as network(s) 135.

Conventional techniques do not provide for automatic or intelligent ways for replacing customer sensitive data during transit while working with third-party entities. For example, conventional techniques do not offer the use of unique transient keys to help eliminate any manual/human involvement. Conventional techniques are limited in their approach and weak in security and therefore they are cumbersome and prone to errors and often require developers and code teams to work on security of data.

Embodiments provide for a cloud-based computing platform, such as transaction platform 230, that offers users with customer relationship management (CRM) applications and services with a native transaction platform that allowed for cloud-based interaction with transaction gateways 240. In one embodiment, transaction gateways 240 are offered to join secured transaction services facilitated by transaction platform 230, and in one embodiment, as facilitated by selection and replacement logic 215, one or more of gateways 240 may accept and choose to participate in secured transaction services. This allows for transaction platform 230 to integrate the one or more participating gateways of gateways 240 into secured transaction services of transaction platform 230 to allow for transactions to take place between users accessing client device 130A and the participating ones of gateways 240 using cloud-based transaction platform 230.

Moreover, transaction platform 230 communicates with apex layer 235 having gateway adapters 237, where each gate adapter corresponds to or is customized for one or more of gateways 240 and is pluggable into transaction platform 230 for seamless integration with secured transaction services. There are gateway adapters 237 that are cloud-based and written in a custom programming language and offered through third-party apex layer 235. An extensive discussion of apex layer 235, gateway adapters 237, and transaction gateways 240 would be beyond the scope of this document. It is contemplated and to be noted that embodiments are not limited to any number or type of gateway adapters 237 and gateways 240.

Embodiments provide for a novel technique for shielding sensitive data associated with customers/users during payment transactions with transaction gateways 240 (e.g., payment gateways), while using various payments techniques and entities such that any (intentional or unintentional) unauthorized access or use of the sensitive data is prevented, where these payment transactions are based on personal and/or merchant payment cards (e.g., credit cards, debit cards, etc.).

It is contemplated that in a pluggable architecture, such as translation platform 230, there can be one or more integrations, including any third-party entities that are involved in request processing of API requests. These requests may contain sensitive data, like user credentials, credit/debit/gift card numbers, credit verification values (CVVs), dates of birth, social security numbers, etc. This sort of data is regarded sensitive because it is private to users and therefore should be avoided from being used (intentionally or unintentionally) by any unauthorized persons or entities. Such sensitive data should be used limited to processing of relevant transactions.

Some of the misuses of sensitive data may include (but are not limited to): 1) dumping of sensitive data in logs in plain text format; 2) storing of sensitive data against requests by users; and 3) giving access to unauthorized users (e.g., persons, entities), etc. Therefore, it is imperative to ensure no sensitive is used beyond the scope of what is essential for the processing and execution of a transaction by any of the integration layers.

In one embodiment, as facilitated by data replacement and communication engine 211 of transaction platform 230, any sensitive data (e.g., user/personal data, such as name, social security number, date of birth, credit report details, credit card details, business profile, etc.) may be detected and/or scanned by data and key reception logic 213, where this sensitive data is then, in real-time, replaced by other substitute or proxy data (e.g., formulae, code, alpha-numeric patterns, design patterns, equations, etc.). In one embodiment, the substitute data (as opposed to the sensitive data) is communicated with other entities, such as gateway adapters 237, as facilitated by communication and storage logic 217.

This replacement of sensitive data with substitute data ensures that the actual sensitive data is made available only to intended external callouts, and not to any third-party developers/integrators or other unknown or unauthorized entities or individuals and thus preventing access to or misuse of any of the sensitive data during transit or transaction. This technique also helps avoid any accidental logging of sensitive data within any application during transit, while offering any sensitive data-related metadata, such as length and data types, etc., so that any external integrators or entities can validate the sensitive data without accessing any portion of it.

Figure 3:
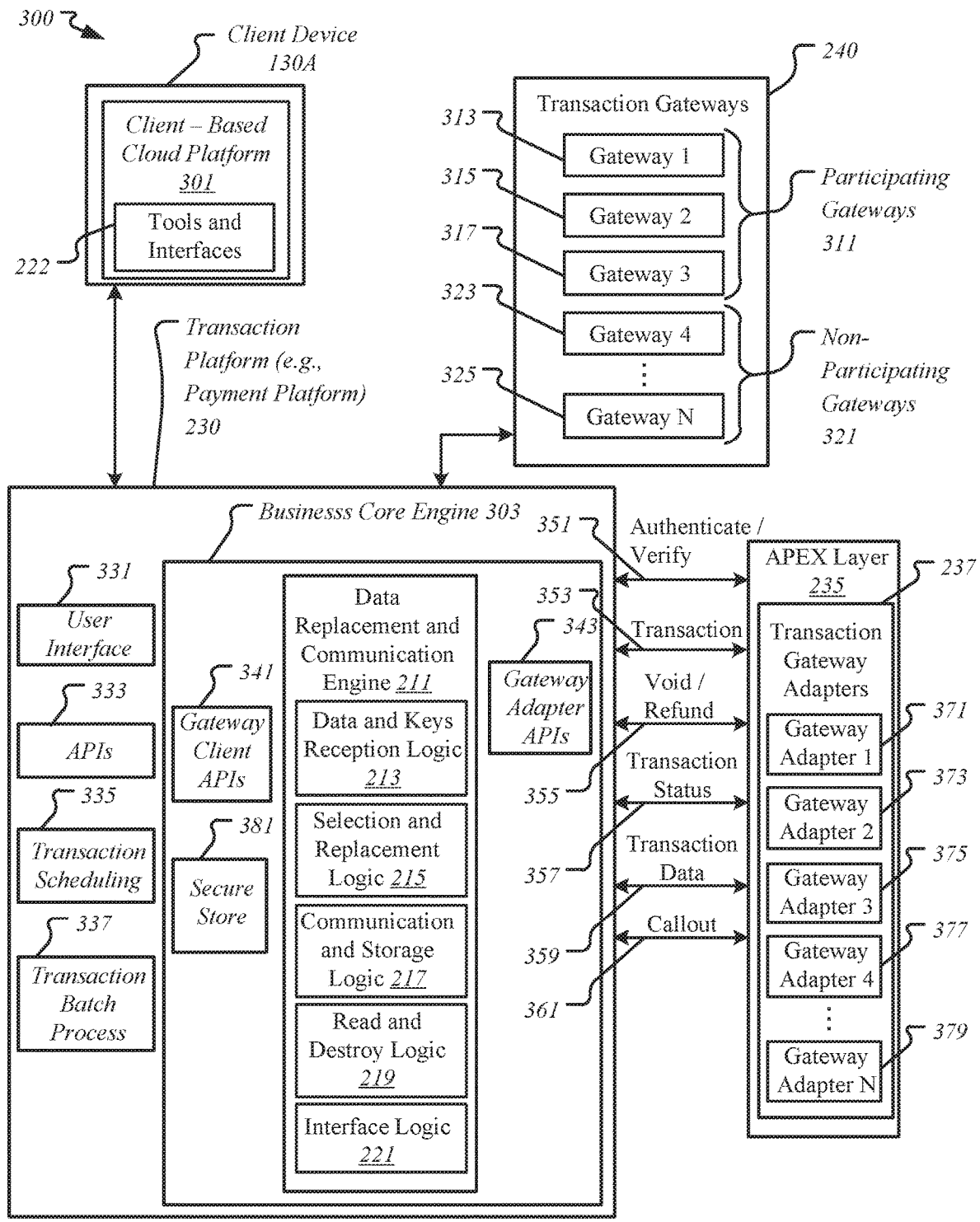
FIG. 3 illustrates an embodiment of an architecture for secured transaction services according to one embodiment.

Further, in one embodiment, the sensitive data is not stored at any external or persistent storage; rather any sensitive data is stored at a local secure store, such as secure store 381 of FIG. 3, that is an instance of transaction platform 230. Further, a replacement service is offered by transaction platform 230, as facilitated by selection and replacement logic 215, to, upon completion of any transactional communication with gateway adapters 237, replace the substitute data with the sensitive data, which may then be securely communicated with a selected gateway of gateways 240 as facilitated by communication and storage logic 217, and then read from secure store and destroyed as facilitated by ready and destroy logic 219.

Further, in one embodiment, this replacement of sensitive data into substitute data may be based on one or more transient keys associated with users associated with the sensitive data. For example, a transient key (e.g., alpha-numeric code or sequence, password, etc.) may be received from a user having access to client device 130A, where the transient key is unique to the user and received by data and keys reception logic 213. In some embodiments, transient keys may be generated by data and keys reception logic 213 based on known information about the users, while, in some embodiments, transient keys are simply received from users interested in facilitating financial transactions (such as making credit card payments) with gateways 240 via transaction platform 230.

As will be further described with reference to FIG. 4A, selection and replacement logic 215 is also used for performing cryptographic tasks (e.g., encryption, decryption, etc.), such as encryption and/or decryption of any sensitive data associated with a user or an organization using one or more transient keys associated with the user and/or the organization. The resulting encrypted string may represent substitute data and maps to the original string representing the sensitive data. Neither the key nor the sensitive data are stored at a persistent storage; rather, they are stored at a secure store instance, such as secure store 381 of FIG. 3, that is part of and offered through memory at transaction platform 230 as facilitated by communication and storage logic 217. In one embodiment, communication and storage logic 217 not only facilitates storage of sensitive data and/or transient keys as secure store 381 of transaction platform 230, but also prevent the storage of any sensitive data and/or transient keys at a persistent storage.

Further, in one embodiment, interface logic 221 may be used to offer application programming interfaces (APIs), such as transaction gateway APIs, transaction gateway client APIs, apex layer APIs, apex transaction gateway adapter APIs, etc. In one embodiment, interface logic 221 may also offer uniform resource locators (URLs) at client device 130A for users to place queries, facilitate financial transactions, input parameters or data, initiate and facilitate communication with transaction platform 230 and gateways 240, etc.

As mentioned previously, it is contemplated that queries may include any number and type of requests seeking responses for processing jobs, running reports, seeking data, etc. These queries are typically placed by users on behalf of tenants, using client device 130A. It is contemplated that a tenant may include an organization of any size or type, such as a business, a company, a corporation, a government agency, a philanthropic or non-profit entity, an educational institution, etc., having single or multiple departments (e.g., accounting, marketing, legal, etc.), single or multiple layers of authority (e.g., C-level positions, directors, managers, receptionists, etc.), single or multiple types of businesses or sub-organizations (e.g., sodas, snacks, restaurants, sponsorships, charitable foundation, services, skills, time etc.) and/or the like Communication/compatibility logic 207 may facilitate the ability to dynamically communicate and stay configured with any number and type of software/application development tools, models, data processing servers, database platforms and architectures, programming languages and their corresponding platforms, etc., while ensuring compatibility with changing technologies, parameters, protocols, standards, etc.

It is contemplated that any number and type of components may be added to and/or removed from sensitive data management mechanism 110 to facilitate various embodiments including adding, removing, and/or enhancing certain features. It is contemplated that embodiments are not limited to any technology, topology, system, architecture, and/or standard and are dynamic enough to adopt and adapt to any future changes.

FIG. 3 illustrates an embodiment of an architecture 300 for secured transaction services according to one embodiment. It is to be noted that for brevity, clarity, and ease of understanding, many of the components and processes described with respect to FIGS. 1-2 may not be repeated or discussed hereafter.

As illustrated, cloud-based transaction platform 230 (e.g., payment platform) is offered and supported by a service provider (e.g., Salesforce.com®) in communication with various entities, such as client device 130A, transaction gateways 240, apex layer 235 having transaction gateway adapters 237, etc., over one or more communication networks, such as network 135 of FIG. 1. Although this architecture 100 is discussed in view of multi-tenant database environment 100 of FIG. 1, it is contemplated that various entities, such as transaction platform 230, may be implemented separately as a cloud computing platform.

In one embodiment, transaction platform 230 is coupled to or in communication with a pluggable architecture that allows for hosting of various transaction gateways 240, such as gateway 1 313, gateway 2 315, gateway 3 317, gateway 4 323, gateway N 325, etc., along with their corresponding transaction gateway adapters 237, such as gateway adapter 1 371, gateway adapter 2 373, gateway adapter 3 375, gateway adapter 4 377, and gateway adapter N 379 as part of third-party apex exchange layer 235, etc.

As illustrated with reference to FIG. 2, in one embodiment, participating gateways 311, such as gateway 1 313, gateway 2 315, gateway 3 317, of gateways 240 that integrate with transaction platform 230 are automatically opted-in to be able to use one or more services offered through transaction platform 230. Similarly, in one embodiment, any corresponding gateway adapters, such as gateway adapter 1 371, gateway adapter 2 373, gateway adapter 3 375, respectively, of gateway adapters 237 are integrated with transaction platform 230.

As illustrated, client device 130A may be in communication with transaction platform 230, and with one or more gateways 240 through transaction platform 230. A user may place a transaction, such as a financial transaction including credit cards, debit cards, gift cards, rewards cards, digital wallets, mobile wallets, automated clearing house (ACH) payments, etc., with one or more of gateways 240 via transaction platform 230.

It is contemplated that transaction platform 230 may employ any number and type of communication and messaging techniques, such as a communications platform as a service (CPaaS) as a cloud-based delivery mode for allowing organizations to add real-time capabilities, such as video, voice, voice messaging, short message service (SMS), multimedia messaging service (MMS), telephony, etc. Further, transaction platform 230 may employ standards-based APIs, comprehensive developer's kits, APEX®, JAVA®, or other libraries for building applications on various platforms. For example, business core engine 303 may be based on JAVA® but it is contemplated and to be noted that embodiments are not limited as such. It is to be noted that APEX® is proprietary language developed by Salesforce.com® that allows client devices, such as client device 130A, to communicate with and deliver functionality on top of Salesforce.com® platform, such as transaction platform 230. Any further discussion of details relating to messaging techniques, APEX®, JAVA®, etc., are beyond the scope of this disclosure.

As illustrated, transaction platform 230 offers a seamless communication and integration with any number and types of transaction gateways 240 by using and exposing transaction gateway adapter APIs 343 (e.g., APEX® transaction gateway adapter APIs) at transaction platform 230. Further, gateway adapter APIs 343 may be used to communicate through gateway adapters 237 through gateway adapter APIs 343 offering various forms of communication standards, such as authorization or verification 351, transaction 353 (e.g., buying, selling, etc.), transaction void, cancellation, or refund 355, transaction status 357, data communication 359, and callout 361, and/or the like. These are merely a few examples of communication between transaction platform 230 and gateway adapters 237 but that embodiments are not limited as such.

In one embodiment, one or more gateways 240 may corresponding to one or more gateway adapters 237, such as gateway 1 313 corresponding to gateway adapter 1 371, gateway 2 315 corresponding to gateway adapter 2 373, gateway 3 317 corresponding to gateway adapter 3 375, and so forth, through various APIs. As previously mentioned, embodiments are not limited to any number or types of gateways 240; however, examples of gateways 240 include one or more of AMAZON PAYMENTS®, FIRST DATA CORPORATION®, BLUEPAY PROCESSING®, PAYSIMPLE®, FASTCHARGE.COM®, PAYNOVA®, ADVEN®, WORLDPAY®, SECUREPAY.COM®, AUTHORIZE.NET®, 2CHECKOUT.COMCHRONOPAY®, SQUARE®, PAYPAL®, STRIPE®, CYBERSOURCE®, etc. Transaction gateways 240 (e.g., payment gateways) may be used to facilitates financial transactions, such as payment transaction, by the transfer of information between payment portals (such as websites, mobile phone applications, interactive voice response services, etc.) and front-end processors or acquiring banks or financial institutions. A payment gateway can, for example, facilitate communication between banks and help a merchant collect payments from a purchaser, or have a user make a credit card payment for the purchase of a product or a service.

Further, as illustrated, any number of users may access one or more tools and interfaces 222 offered through client-based cloud platform 301 at client device 130A for communication with gateways 240 for their financial transactions through transaction platform 230 via gateway client APIs 341. Any of these users may transact business through transaction platform 230, such as sales, purchases, returns, etc., using client device 130A, while client device 130 and gateways 240 remain in communication with but outside of transaction platform 230.

In one embodiment, gateway adapters 237 of apex layer 235 may be customized and/or integrated with transaction platform 230 to allow for gateways 240 to use a standardized APIs, such as APEX® gateway adapters APIs, to be able to manage for gateway adapters 237 to have their own package code for communication with their corresponding gateways 240. Similarly, client devices, such as client device 130A, may be given access to various gateway adapters 237 for gateways 240 so they may install them and initiate different payment gateway adapters 237 for selecting one or more of gateways 240.

In one embodiment, transaction platform 230 is a cloud-based transaction platform that includes user interfaces 331, transaction APIs 333, transaction schedulers 335, and transaction batch processes 337, etc. As described with reference to FIG. 2, transaction platform 230 may be part of or hosted by server computer 120 or offered as a separate platform separate from server computer 120. UIs 331 include user interfaces for interacting with transaction APIs 333 and facilitating financial transactions, such as payment transactions, where APIs 333, like APIs 341, may include any number and type of application programming interfaces, such as Representational State Transfer (REST) APIs, Simple Object Access Protocol (SOAP) APIs, and APEX® APIs, etc., for client device 130A for interacting with transaction platform 230 for performing financial transactions and further with gateway client APIs 341 for transacting with gateways 240. For example, transaction gateway 1 313 (e.g., SQUARE®) may use the transaction gateway client APIs 341 to integrate with transaction platform 230 and implements transaction gateway adapter APIs 343, while the client device 130A may select to use any type transaction gateway client APIs 341, such as SOAP APIs, REST APIs, APEX® APIs, etc.

Further, as illustrated, transaction platform 230 hosting business core engine 303 including data replacement and communication engine 211 having data and keys reception logic 213; selection and replacement logic 215; communication and storage logic 217; read and destroy logic 219; and interface logic 221 as further described with reference to FIG. 2. Business core engine 303 further includes gateway client APIs 341 and gateway adapter APIs 343 work with data replacement and communication engine 211 to facilitate and manage various transactions, interactions, and communications between various entities of architecture 300.

Whiles these APIs 341, 343 seamlessly expose and integrate various entities, such as client device 130A, transaction platform 230, transaction gateways 240, and transaction gateway adapters 237, etc., it is data replacement and communication engine 211 that facilitates and manages various tasks and transactions between them.

For example, as described with reference to FIG. 2, data and keys reception logic 213 may be used to detect or receive a request from a user having access to client device 130A for performance of a financial transaction, such as making or receiving a credit card payment, etc. In one embodiment, this request may also include or be associated with a transient key that is unique to the user and/or to an organization or tenant associated with or represented by the user. This unique transient key allows data and key reception logic 213 to recognize and authenticate the user (and/or their associated organization) to then initiate the financial transaction requested by the user by triggering selection and replacement logic 215.

As discussed with reference to FIG. 2, the request may further include or offer access to information that may be personal to the user and/or the organization and be regarded as sensitive or confidential. For example, this information may include the user's social security number, date of birth, other personal information, etc., that is to be prevented from being accessible to any unauthorized individuals or entities from accessing and using for illegal and/or unauthorized activities.

It is contemplated and to be noted that embodiments are not limited to any specific techniques through which gateways 240, gateway adapters 237, etc., are integrated into or work with transaction platform 230. For example, in one embodiment, gateways 240, gateway adapters 237, etc., are automatically opted into participating in one or more services offered by a service provider (e.g., Salesforce.com®) and integrated with or coupled to transaction platform 230, where, for example, all gateways 240 are regarded as participating (including gateways 323, 325) and none are labeled as non-participating. In another embodiment, selection and replacement logic 215 may be used to determine whether any of gateways 240 wish to participate and/or have adequate system capabilities and infrastructure to be able to participate in one or more services (e.g., secured transaction service) offered by a service provider (e.g., Salesforce.com®) and facilitated by transaction platform 230. For example, as illustrated, gateways 313, 315, 317 are regarded as participating gateways 311, while gateways 323, 325 are regarded as non-participating gateways 321, where, for example, participating gateways 311 and any corresponding gateway adapters 371, 373, 375 are coupled to or integrated with transaction platform 230. This technique allows for flexibility in participation in any one or more services and, in turn, selection and replacement logic 215 to select any one or more of participating gateways 311 for processing of one or more transactions requested by one or more users via client device 130A.

For example, upon detecting the query and the information (associated with the query) and verifying the transient key, in one embodiment, selection and replacement logic 215 may then be triggered to select a participating gateway, such as gateway 1 313, for performance of a financial transaction (e.g., payment) requested by the query. In some embodiments, upon selection of a selection gateway like gateway 313, a corresponding gateway adapter, such as gateway adapter 1 371, may also be identified for seamless progression and completion of the transaction. As will be further illustrated with reference to FIG. 4A, any sensitive data of the information, as detected by data and keys reception logic, is then replaced with substitute data (e.g., proxy data, such as code, formulae, equations, alpha-numeric patterns, etc.) by selection and replacement logic 215.

In one embodiment, this substitute data, as opposed to the sensitive data, is then communicated, as facilitated by communication and storage logic 217, to facilitate processing and completion of the transaction. Similarly, in one embodiment, the sensitive data may then be stored at secure store

381 at transaction platform 230, as facilitated by communication and storage logic 217, while avoiding storage of the sensitive data at any persistent storage, such as database(s) 140 of FIG. 1. Continuing with this transaction, communication and storage logic 217 to facilitate communication of the substitute data with gateway adapter 371 of apex layer 235 where, as will be further described with reference to FIG. 4A, a number of tasks are performed and any pertinent information is communicated back to transaction platform 230.

At this stage, in one embodiment, the substitute data is then replaced back with the sensitive data, as facilitated by selection and replacement logic 215, where this sensitive data, along with any other pertinent data, is then communicated on to gateway 313 as facilitated by communication and storage logic 217. Further, in one embodiment, the sensitive data stored at secure store 381 is accessed, read, and then destroyed as facilitated by read and destroy logic 219. This technique and its processes continue with various queries seeking transactions such that any sensitive data (e.g., user's personal information) is continuously protected through replacement with substitute data, while any unauthorized access and use of this sensitive data by any unauthorized user or entity is prevented.

Figure 4A:
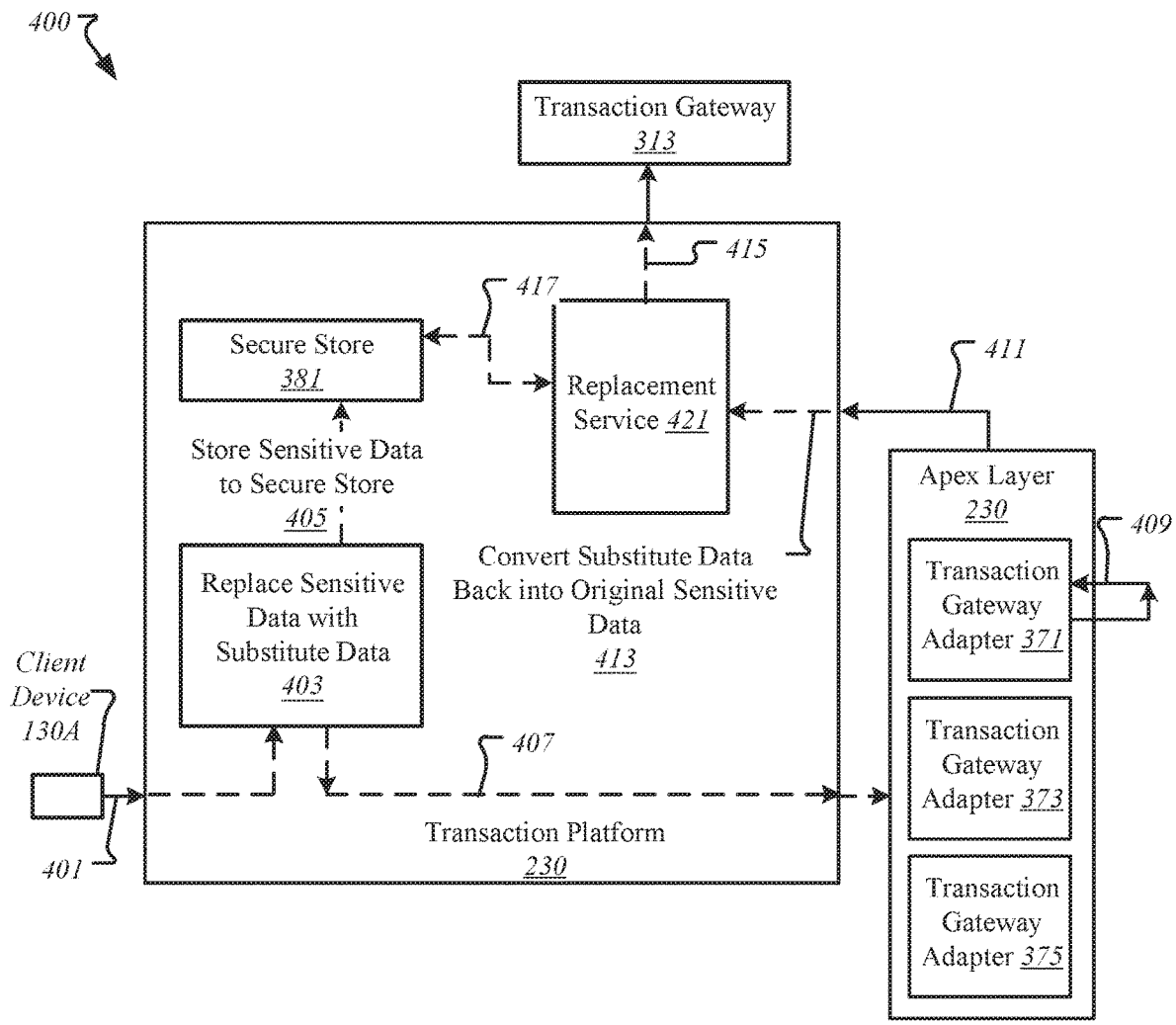
FIG. 4A illustrates a transaction sequence for facilitating secured transaction services based on the architecture of FIG. 3 according to one embodiment.

FIG. 4A illustrates a transaction sequence 400 for facilitating secured transaction services based on architecture 300 of FIG. 3 according to one embodiment. Method 400 may be performed by processing logic that may comprise hardware (e.g., circuitry, dedicated logic, programmable logic, etc.), software (such as instructions run on a processing device), or a combination thereof. In one embodiment, method 400 may be performed or facilitated by one or more components of sensitive data management mechanism 110 of FIG. 1. The processes of method 400 are illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 1-3 may not be repeated or discussed hereafter.

Prior to discussing transaction sequence 400, consider a financial transaction involving payment, where a user (e.g., buyer) send a request to an API with payment method details, such as credit card numbers, CVV, etc., to transfer an amount of money to a merchant. In such a case, a service provider (e.g., Salesforce.com®), being payment card industry (PCI)-compliant, would continue to maintain privacy and secrecy of such sensitive data and would not wish to store any of that data.

Similarly, in a microservice architecture, roles and responsibilities may be distributed across multiple microservices. For example, an API request may involve process by many of such services in the same execution flow, where each may have their own business logic and the sensitive data may be needed to be shared with different services for successful processes of the request. In such a scenario, it would be expected that the sensitive data is safe and secure and not misused in any manner or form.

Embodiments provide for ensuring that any sensitive data is merely used in a limited fashion for processing of a transaction or request and that it is not stored at a persistent data storage, keeping the sensitive data from being intentionally or unintentionally accessed or used (intentionally or unintentionally) for misuse by any of the integration layers, etc.

For example, secure store 381 may refer to a class that can store values in private variables using encryption in memory, and not in a persistence storage. For example, values may be encrypted of any of the sensitive data using cryptographic library provided by a service provider platform, such as transaction platform 230 by Salesforce.com®, where below are a few features associated with a cryptographic library: any sensitive data is encrypted/decrypted using transient keys, such as: a) transient keys remain at an application server memory (e.g., secure store 381) and not at a persistent storage; b) no unauthorized user is offered access to the transient keys; and c) transient keys may be auto-rotated to eliminate any human involvement or influence. In one embodiment, any cryptographic tasks, such as encryption, decryption, etc., are facilitated by communication and storage logic 217.

Further, any encrypted values are stored and generates a new formula string that is mapped to the original string associated with the sensitive data, and as soon as the formula string is read, it is destroyed. This way, any sensitive data may just be ready by replacement service 417 as triggered by selection and replacement logic 215 of FIG. 2, and a separate instance is initiated for each thread that is not logged. Further, a callout, such as callout 361 of FIG. 3, may be performed using a Hyper-Text Transport Protocol (HTTP) Apex class, which is API implemented in transaction platform 230.

Referring to transaction sequence 400, at 401, a request for facilitating a financial transaction is placed at transaction platform 230 by a user via client device 130A. For example, the request (e.g., API request) may include information having sensitive data (e.g., personal information associated with the user, such as credit card number, CVV, user birthdate, user social security number, etc.), non-sensitive data, and a transient key. This API request with sensitive data may be part of a request object and is received at transaction platform 230 as facilitated by data and keys reception logic 213 of data replacement and communication engine 211 of business core engine 303 of FIG. 3.

Further, for example, this request may include a payment request having sensitive data, like credit card number, CVV, etc., as follows:

```
"transaction_type": "sale",
"method": "credit card",
"amount": "1234",
"currency_code": "USD",
"credit_card": {
    "type": "visa",
    "cardholder_name": "John Dow",
    "card_number": "47882500012348291",
    "exp_date": "1020",
    "cvv": "123"
```

Upon receiving the request object, at 403, in one embodiment, the sensitive data is converted into substitute data, such as an array of bytes, as facilitated by selection and reception logic 213 at transaction platform 230 of FIG. 3. Further, in one embodiment, at 405, the sensitive data is encrypted, as facilitated by selection and replacement logic 215 and using one or more cryptographic techniques, and then stored in an instance of secure store 381 as facilitated by communication and storage logic 217 of FIG. 3. For example, credit card number or CVV, etc., may be extracted from the request, encrypted, and then stored in an instance at secure store 381.

Further, upon storing the sensitive data at secure store 381, each value in the sensitive data is replaced with a unique formula, where, for example, a credit card number may be replaced with a formula in the request object, such as {$CREDIT_CARD_NUMBER_!@#$}, while the corresponding CVV may be replaced with the following formula, such as {$CVV_!@#$}. These formula strings may be referred to as replacement strings or substitute strings. In one embodiment, along with any substitute stings, some other metadata may also be passed on to apex layer 235, where this metadata offers pertinent information about original values, such as length of CCS number, length of CVV, whether these values are alphanumeric or simply numeric, and/or the like.

Now, at 407, apex layer 235 (or any other layer) associated with transaction gateway adapters 371, 373, 375 may receive the request object with replacement strings as facilitated by communication and storage logic 217, which is to ensure that any sensitive data is secured and to prevent any potential misuse. For example, any replacement or substitute data representing the original request may be received at apex layer 235 as follows:

```
{
    "transaction_type": "sale",
    "method": "credit_card",
    "amount": "1234",
    "currency_code": "USD",
    "credit_card": {
        "type": "visa", "cardholder_name": "John Dow",
        "card_number":
        "{$CREDIT_CARD_NUMBER_!@#$}",
        "exp_date": "1020",
        "cvv": "{$CVV_!@#$}"
    }
}
```

One or more of transaction gateway adapters 237 are then triggered, where selection and replacement logic 215 of FIG. 3 may select, for example, one of participating gateways, such as transaction gateway 313, and its corresponding transaction gateway adapter, such as transaction gateway adapter 371, of gateway adapters 371, 373, 375 at apex layer 235. Upon selection, in one embodiment, at 409, gateway adapter 371 may use the substitute data having replacement strings to fetch any input values from any respective transient keys associated with the input variables. This way, since gateway adapter 371 needs to communicate the request and certain information to the corresponding gateway 313 for processing of the request, gateway adapter 371 having dealt with substitute data, creates a new request body that is compatible with gateway 313, which may then be communicated over to gateway 313. This new request body may contain formulae of fields to represent and replace the actual sensitive data values.

At 411, in one embodiment, a callout happens using APIs at transaction platform 230, where apex classes use HTTP apex classes to make the call and this apex HTTP class is regarded as an API that is implemented in JAVA, at transaction platform 230, such as gateway adapter APIs 343 of FIG. 3. For example, a snipped of Apex code is as follows:

HttpRequest req=buildRequest (inputFromUser);
commercepayments.PaymentsHttp http=new commercepayments.PaymentsHttp( );
HttpResponse res=http.send (req);

Now, this callout, at 411, is intercepted by replacement service 421, where commercepayments.PaymentsHttp is exposed an API to apex layer 235 and is implemented at transaction platform 230. Further, it is contemplated that replacement service 421 may not make callout 411; rather, it represents a process that is executed just prior to making of callout 411. In one embodiment, at 413, the substitute data is replaced back with the original sensitive data by replacement service 421. Further, where commercepayments.PaymentsHttp API makes an embedded service, such as ReplacementService and, at 415, replacement service 421 talks to secure store 381 and replaces the substitute data (e.g., formulae) with the actual sensitive data for the call replacement service 421 access and talks to secure store 381 to not only replace the substitute data with the original sensitive data for the callout to gateway 313 to succeed, and the decrypted value is directed replaced in the stream of data (e.g., in bytes) while sending the callout.

Further, at 417, replacement service 421 access secure store 381 to read and destroy the sensitive data stored at secure store 381. For example, as soon as the sensitive data is read by a secure store instance at secure store 381, the sensitive data is then deleted and destroyed. This data, in any form (such as encrypted or not), is not persisted beyond the scope of this request.

Figure 4B:
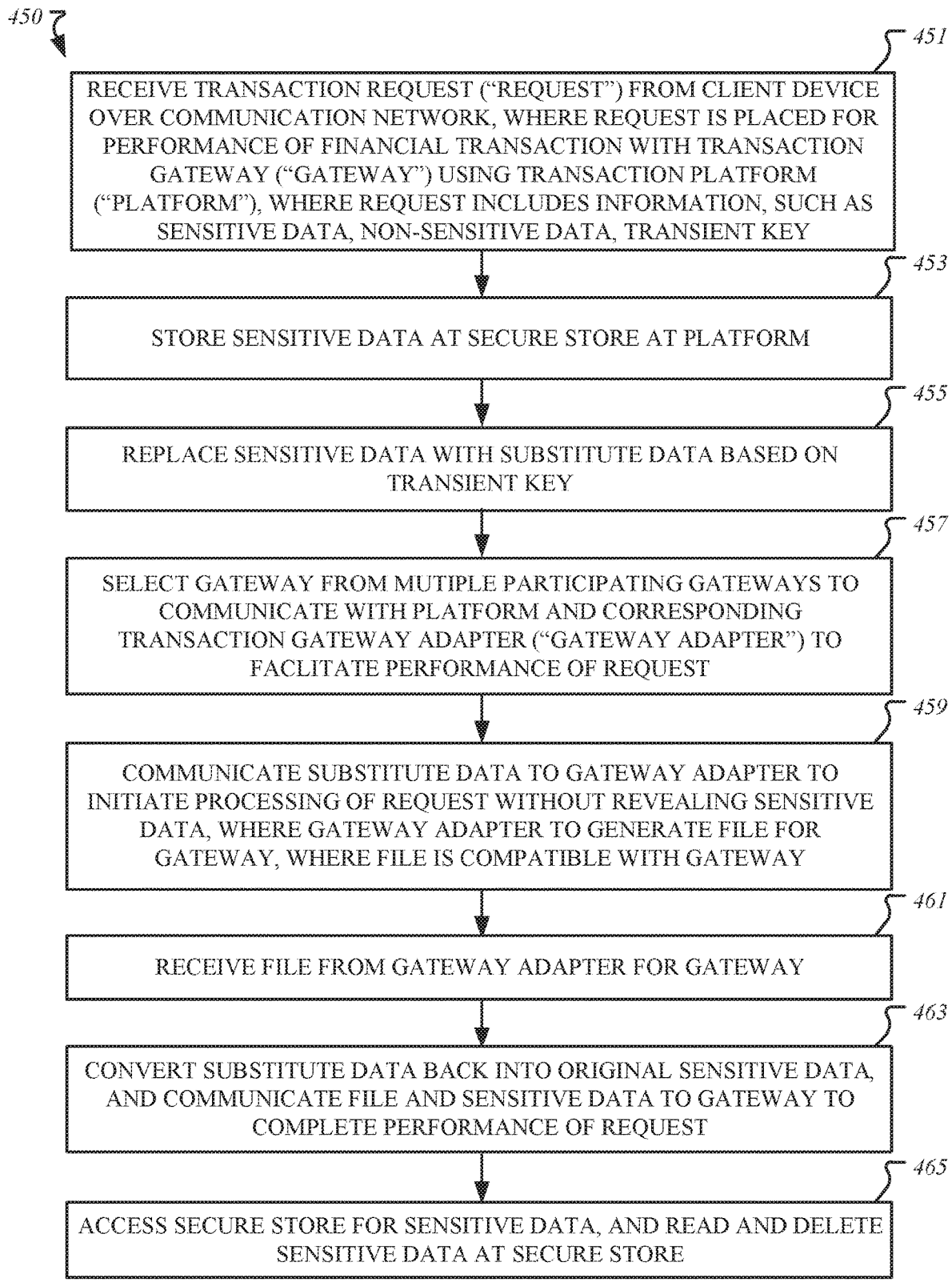
FIG. 4B illustrates a method for facilitating secured transaction services according to one embodiment.

FIG. 4B illustrates a method 450 for facilitating secured transaction services according to one embodiment. Method 450 may be performed by processing logic that may comprise hardware (e.g., circuitry, dedicated logic, programmable logic, etc.), software (such as instructions run on a processing device), or a combination thereof. In one embodiment, method 450 may be performed or facilitated by one or more components of sensitive data management mechanism 110 of FIG. 1. The processes of method 450 are illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 1-4A may not be repeated or discussed hereafter.

Method 450 begins at block 451 with receiving of transaction request from a client device over a communication network, where the request is placed at a transaction platform to facilitate performance of a financial transaction (e.g., payment) on behalf of a user associated with the client device. In one embodiment, the request may contain information pertinent to the transaction and/or the user, including sensitive data (e.g., user personal/financial information) and non-sensitive data along with one or more transient keys unique to the user, the client device, etc.

At block 453, in one embodiment, the sensitive data is stored at a secure store instance of the transaction platform, without having to store this sensitive data at any persistent storage. At block 455, the sensitive data is then replaced with or converted into substitute data based on the one or more transient keys, where the substitute data serves as proxy data for the sensitive data so that the sensitive data is protected from any misuse and not revealed or accessible to any unauthorized user or entity. At block 457, in one embodiment, a participating gateway is selected from any number of participating gateways to communicate and work with the transaction platform and any corresponding transaction gateway adapter at an apex layer to facilitate performance of the transaction.

At 459, the substitute data is communicated to the gateway adapter, which may be plugged into or integrated with the transaction platform, where the gateway adapter receives and analyzes the substitute data and generates a file (or a new request) that is compatible with the gateway. This file is generated using the gateway adapter and based on the substitute data. At block 461, this file/new request is received from the gateway adapter and communicated on to the gateway for further processing and completing of the transaction.

At block 463, in one embodiment, the substitute data is then converted back into the original sensitive data, while, at block 465, secure store at the transaction platform is accessed for the sensitive data, where the sensitive data is read and deleted in permanence.

Figure 5:
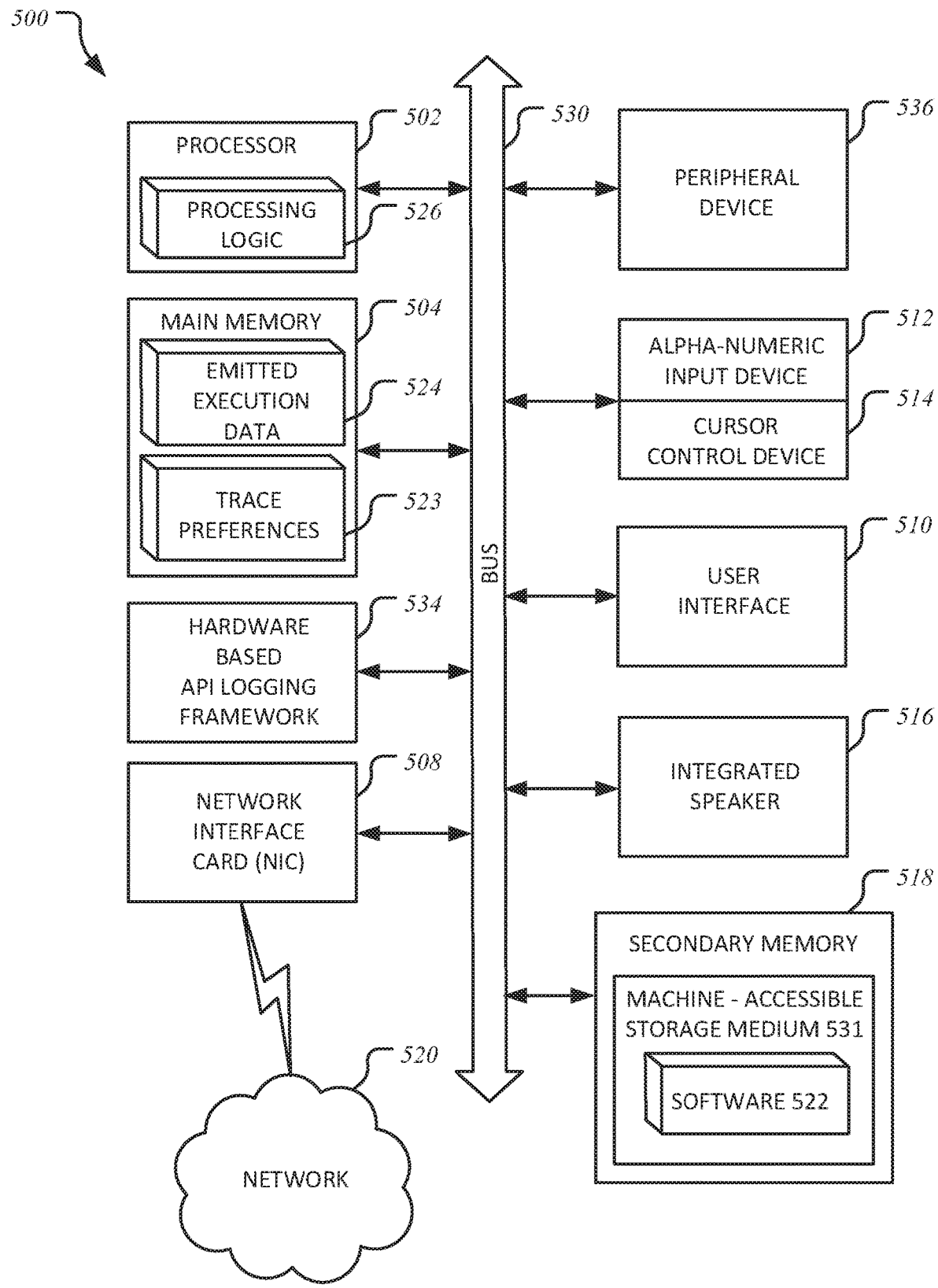
FIG. 5 illustrates a computer system according to one embodiment.

FIG. 5 illustrates a diagrammatic representation of a machine 500 in the exemplary form of a computer system, in accordance with one embodiment, within which a set of instructions, for causing the machine 500 to perform any one or more of the methodologies discussed herein, may be executed. Machine 500 is the same as or similar to computing devices 120, 130A-N of FIG. 1. In alternative embodiments, the machine may be connected (e.g., networked) to other machines in a network (such as host machine 120 connected with client machines 130A-N over network(s) 135 of FIG. 1), such as a cloud-based network, Internet of Things (IoT) or Cloud of Things (CoT), a Local Area Network (LAN), a Wide Area Network (WAN), a Metropolitan Area Network (MAN), a Personal Area Network (PAN), an intranet, an extranet, or the Internet. The machine may operate in the capacity of a server or a client machine in a client-server network environment, or as a peer machine in a peer-to-peer (or distributed) network environment or as a server or series of servers within an on-demand service environment, including an on-demand environment providing multi-tenant database storage services. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 518 (e.g., a persistent storage device including hard disk drives and persistent multi-tenant data base implementations), which communicate with each other via a bus 530. Main memory 504 includes emitted execution data 524 (e.g., data emitted by a logging framework) and one or more trace preferences 523 which operate in conjunction with processing logic 526 and processor 502 to perform the methodologies discussed herein.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute the processing logic 526 for performing the operations and functionality of smart moderation/validation mechanism 110 as described with reference to FIG. 1 and other Figures discussed herein.

The computer system 500 may further include a network interface card 508. The computer system 500 also may include a user interface 510 (such as a video display unit, a liquid crystal display (LCD), or a cathode ray tube (CRT)), an alphanumeric input device 512 (e.g., a keyboard), a cursor control device 514 (e.g., a mouse), and a signal generation device 516 (e.g., an integrated speaker). The computer system 500 may further include peripheral device 536 (e.g., wireless or wired communication devices, memory devices, storage devices, audio processing devices, video processing devices, etc. The computer system 500 may further include a Hardware based API logging framework 534 capable of executing incoming requests for services and emitting execution data responsive to the fulfillment of such incoming requests.

The secondary memory 518 may include a machine-readable storage medium (or more specifically a machine-accessible storage medium) 531 on which is stored one or more sets of instructions (e.g., software 522) embodying any one or more of the methodologies or functions of smart moderation/validation mechanism 110 as described with reference to FIG. 1, respectively, and other figures discussed herein. The software 522 may also reside, completely or at least partially, within the main memory 504 and/or within the processor 502 during execution thereof by the computer system 500, the main memory 504 and the processor 502 also constituting machine-readable storage media. The software 522 may further be transmitted or received over a network 520 via the network interface card 508. The machine-readable storage medium 531 may include transitory or non-transitory machine-readable storage media.

Portions of various embodiments may be provided as a computer program product, which may include a computer-readable medium having stored thereon computer program instructions, which may be used to program a computer (or other electronic devices) to perform a process according to the embodiments. The machine-readable medium may include, but is not limited to, floppy diskettes, optical disks, compact disk read-only memory (CD-ROM), and magneto-optical disks, ROM, RAM, erasable programmable read-only memory (EPROM), electrically EPROM (EEPROM), magnet or optical cards, flash memory, or other type of media/machine-readable medium suitable for storing electronic instructions.

The techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment may be implemented using different combinations of software, firmware, and/or hardware.

Figure 6:
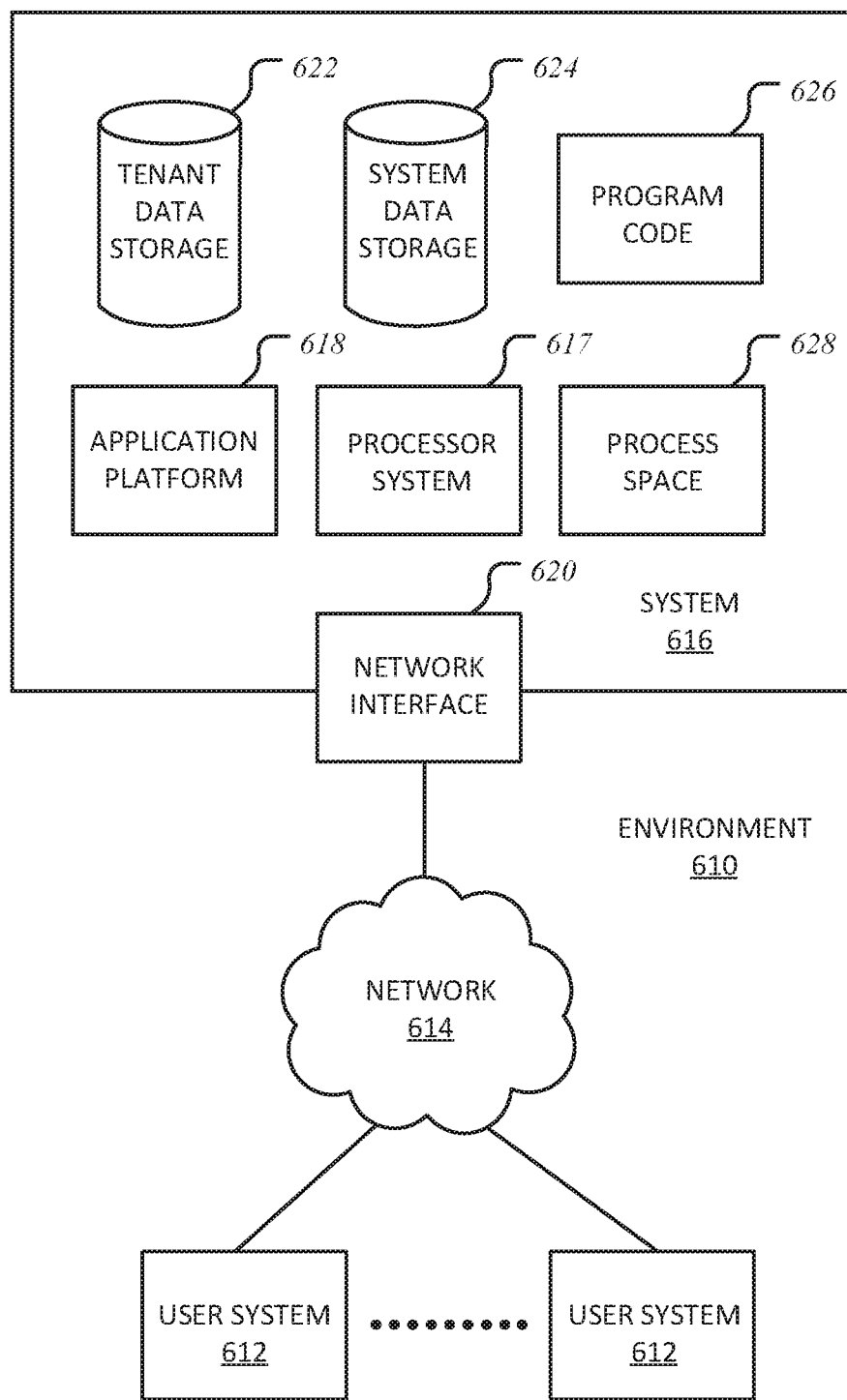
FIG. 6 illustrates an environment wherein an on-demand database service might be used according to one embodiment.

FIG. 6 illustrates a block diagram of an environment 610 wherein an on-demand database service might be used. Environment 610 may include user systems 612, network 614, system 616, processor system 617, application platform 618, network interface 620, tenant data storage 622, system data storage 624, program code 626, and process space 628. In other embodiments, environment 610 may not have all of the components listed and/or may have other elements instead of, or in addition to, those listed above.

Environment 610 is an environment in which an on-demand database service exists. User system 612 may be any machine or system that is used by a user to access a database user system. For example, any of user systems 612 can be a handheld computing device, a mobile phone, a laptop computer, a workstation, and/or a network of computing devices. As illustrated in herein FIG. 6 (and in more detail in FIG. 7) user systems 612 might interact via a network 614 with an on-demand database service, which is system 616.

An on-demand database service, such as system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 616" and "system 616" will be used interchangeably herein. A database image may include one or more database objects. A relational database management system (RDMS) or the equivalent may execute storage and retrieval of information against the database object(s). Application platform 618 may be a framework that allows the applications of system 616 to run, such as the hardware and/or software, e.g., the operating system. In an embodiment, on-demand database service 616 may include an application platform 618 that enables creation, managing and executing one or more applications developed by the provider of the on-demand database service, users accessing the on-demand database service via user systems 612, or third-party application developers accessing the on-demand database service via user systems 612.

The users of user systems 612 may differ in their respective capacities, and the capacity of a particular user system 612 might be entirely determined by permissions (permission levels) for the current user. For example, where a salesperson is using a particular user system 612 to interact with system 616, that user system has the capacities allotted to that salesperson. However, while an administrator is using that user system to interact with system 616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 614 is any network or combination of networks of devices that communicate with one another. For example, network 614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 612 might communicate with system 616 using TCP/IP and, at a higher network level, use other common Internet protocols to communicate, such as HTTP, FTP, AFS, WAP, etc. In an example where HTTP is used, user system 612 might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load-sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 616, shown in FIG. 6, implements a web-based customer relationship management (CRM) system. For example, in one embodiment, system 616 includes application servers configured to implement and execute CRM software applications as well as provide related data, code, forms, webpages and other information to and from user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 616 implements applications other than, or in addition to, a CRM application. For example, system 616 may provide tenant access to multiple hosted (standard and custom) applications, including a CRM application. User (or third-party developer) applications, which may or may not include CRM, may be supported by the application platform 618, which manages creation, storage of the applications into one or more database objects and executing of the applications in a virtual machine in the process space of the system 616.

One arrangement for elements of system 616 is shown in FIG. 6, including a network interface 620, application platform 618, tenant data storage 622 for tenant data 623, system data storage 624 for system data 625 accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database-indexing processes.

Several elements in the system shown in FIG. 6 include conventional, well-known elements that are explained only briefly here. For example, each user system 612 could include a desktop personal computer, workstation, laptop, PDA, cell phone, or any wireless access protocol (WAP) enabled device or any other computing device capable of interfacing directly or indirectly to the Internet or other network connection. User system 612 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 612 to access, process and view information, pages and applications available to it from system 616 over network 614. User system 612 further includes Mobile OS (e.g., iOS® by Apple®, Android®, WebOS® by Palm®, etc.). Each user system 612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device can be used to access data and applications hosted by system 616, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 612 and all of its components are operator configurable using applications, such as a browser, including computer code run using a central processing unit such as an Intel Core® processor or the like. Similarly, system 616 (and additional instances of an MTS, where more than one is present) and all of their components might be operator configurable using application(s) including computer code to run using a central processing unit such as processor system 617, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 616 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™ JavaScript, ActiveX, any other scripting language, such as VBScript, and many other programming languages as are well known may be used. (Java™ is a trademark of Sun Microsystems, Inc.).

According to one embodiment, each system 616 is configured to provide webpages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 7:
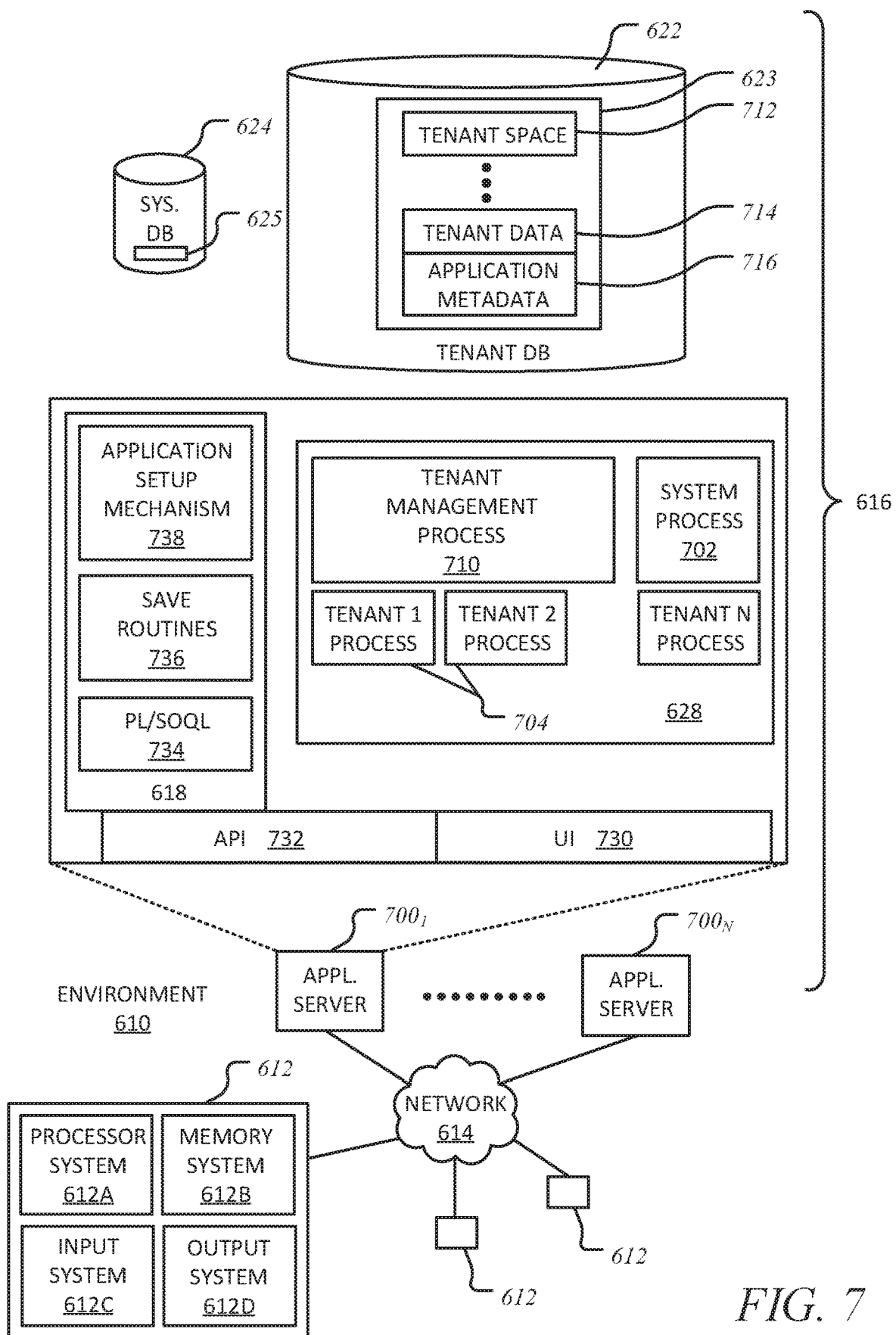
FIG. 7 illustrates elements of environment of FIG. 6 and various possible interconnections between these elements according to one embodiment.

FIG. 7 also illustrates environment 610. However, in FIG. 7 elements of system 616 and various interconnections in an embodiment are further illustrated. FIG. 7 shows that user system 612 may include processor system 612A, memory system 612B, input system 612C, and output system 612D. FIG. 7 shows network 614 and system 616. FIG. 7 also shows that system 616 may include tenant data storage 622, tenant data 623, system data storage 624, system data 625, User Interface (UI) 730, Application Program Interface (API) 732, PL/SOQL 734, save routines 736, application setup mechanism 738, applications servers $700_1$-$700_N$, system process space 702, tenant process spaces 704, tenant management process space 710, tenant storage area 712, user storage 714, and application metadata 716. In other embodiments, environment 610 may not have the same elements as those listed above and/or may have other elements instead of, or in addition to, those listed above.

User system 612, network 614, system 616, tenant data storage 622, and system data storage 624 were discussed above in FIG. 6. Regarding user system 612, processor system 612A may be any combination of one or more processors. Memory system 612B may be any combination of one or more memory devices, short term, and/or long term memory. Input system 612C may be any combination of input devices, such as one or more keyboards, mice, trackballs, scanners, cameras, and/or interfaces to networks. Output system 612D may be any combination of output devices, such as one or more monitors, printers, and/or interfaces to networks. As shown by FIG. 7, system 616 may include a network interface 620 (of FIG. 6) implemented as a set of HTTP application servers $700_1$-$700_N$, an application platform 618, tenant data storage 622, and system data storage 624. Also shown is system process space 702, including individual tenant process spaces 704 and a tenant management process space 710. Each application server $700_1$-$700_N$ may be configured to tenant data storage 622 and the tenant data 623 therein, and system data storage 624 and the system data 625 therein to serve requests of user systems 612. The tenant data 623 might be divided into individual tenant storage areas 712, which can be either a physical arrangement and/or a logical arrangement of data. Within each tenant storage area 712, user storage 714 and application metadata 716 might be similarly allocated for each user. For example, a copy of a user's most recently used (MRU) items may be stored to user storage 714. Similarly, a copy of MRU items for an entire organization that is a tenant might be stored to tenant storage area 712. A UI 730 provides a user interface and an API 732 provides an application programmer interface to system 616 resident processes to users and/or developers at user systems 612. The tenant data and the system data may be stored in various databases, such as one or more Oracle™ databases.

Application platform 618 includes an application setup mechanism 738 that supports application developers' creation and management of applications, which may be saved as metadata into tenant data storage 622 by save routines 736 for execution by subscribers as one or more tenant process spaces 704 managed by tenant management process 710 for example. Invocations to such applications may be coded using PL/SOQL 734 that provides a programming language style interface extension to API 732. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 716 for the subscriber making the invocation and executing the metadata as an application in a virtual machine.

Each application server $700_1$-$700_N$ may be communicably coupled to database systems, e.g., having access to system data 625 and tenant data 623, via a different network connection. For example, one application server $700_1$ might be coupled via the network 614 (e.g., the Internet), another application server $700_{N-1}$ might be coupled via a direct network link, and another application server $700_N$ might be coupled by yet a different network connection. Transfer Control Protocol and Internet Protocol (TCP/IP) are typical protocols for communicating between application servers $700_1$-$700_N$ and the database system. However, it will be apparent to one skilled in the art that other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 Big-IP load balancer) is communicably coupled between the application servers 700 and the user systems 612 to distribute requests to the application servers 700. In one embodiment, the load balancer uses a least connections algorithm to route user requests to the application servers 700. Other examples of load balancing algorithms, such as round robin and observed response time, also can be used. For example, in certain embodiments, three consecutive requests from the same user could hit three different application servers 700, and three requests from different users could hit the same application server 700. In this manner, system 616 is multi-tenant, wherein system 616 handles storage of, and access to, different objects, data and applications across disparate users and organizations.

As an example of storage, one tenant might be a company that employs a sales force where each salesperson uses system 616 to manage their sales process. Thus, a user might maintain contact data, leads data, customer follow-up data, performance data, goals and progress data, etc., all applicable to that user's personal sales process (e.g., in tenant data storage 622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 616 might also maintain system level data usable by multiple tenants or other data. Such system level data might include industry reports, news, postings, and the like that are sharable among tenants.

In certain embodiments, user systems 612 (which may be client systems) communicate with application servers 700 to request and update system-level and tenant-level data from system 616 that may require sending one or more queries to tenant data storage 622 and/or system data storage 624. System 616 (e.g., an application server 700 in system 616) automatically generates one or more SQL statements (e.g., one or more SQL queries) that are designed to access the desired information. System data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Any of the above embodiments may be used alone or together with one another in any combination. Embodiments encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive.

What is claimed is:

1. A computer-implemented method comprising:

receiving, by a data replacement and communication engine of a transaction platform, a request to facilitate a financial transaction from an external computing device;

determining, by the data replacement and communication engine, that the received request comprises sensitive data and one or more transient keys associated with a user;

monitoring, by the data replacement and communication engine, an unsecure gateway participation in securing sensitive data;

selecting, by the data replacement and communication engine, the unsecure gateway based on the monitoring;

facilitating, by the data replacement and communication engine, performance of the financial transaction as a secure transaction using the selected unsecure gateway;

replacing, by the data replacement and communication engine, based on the one or more transient keys, the sensitive data with substitute data that is unique to the user in real-time before sending the financial transaction through the unsecure gateway, thereby securing the financial transaction;

communicating, by the data replacement and communication engine the financial transaction, including the substitute data, to a gateway adapter;

receiving, by the gateway adapter, the communicated financial transaction including the substitute data;

determining, by the gateway adapter, that the substitute data is communicated in lieu of the sensitive data;

generating, by the gateway adapter, a file for the unsecure gateway; and converting, by the gateway adapter, the substitute data into the sensitive data.

2. The method of claim 1, further comprising:

prior to replacing the sensitive data into the substitute data, storing the sensitive data at a secure store instance of a transaction platform in communication with the gateway, the gateway adapter, and the external computing device including a client device; and upon converting the substitute data into the sensitive data, deleting the sensitive data from the secure store instance of the transaction platform.

3. The method of claim 1, further comprising communicating the file to the gateway, wherein the gateway to further facilitate and complete the financial transaction.

4. The method of claim 1, wherein the request further comprises non-sensitive data in addition the sensitive data and the one or more transient keys, wherein the sensitive data includes personal data relating to the user, wherein the personal data includes one or more of a birthdate, a social security number, a credit card number, a card verification value, a debit card number, a gift card number, and bank account information.

5. The method of claim 1, further comprising:

integrating the gateway adapter into the transaction platform, wherein the transaction platform is cloud-based and includes a pluggable architecture for integration of one or more entities including a plurality of gateway adapters having the gateway adapter; and facilitating communication between transaction platform, the gateway, the gateway adapter, and the external computing device via one or more application programming interfaces (APIs) offered by the transaction platform.

6. The method of claim 1, wherein the substitute data comprises one or more of codes, alpha-numeric patterns, characters, equations, and formulae, wherein the substitute data serves to represent the sensitive data without revealing the sensitive data to protect the sensitive data from unauthorized accesses and misuses throughout processing of the financial transaction.

7. A database system comprising:
a server computing device hosting a transaction platform coupled to one or more of gateways, gateway adapters, and a database, the transaction platform to facilitate operations comprising:
receiving, by a data replacement and communication engine of a transaction platform, a request to facilitate a financial transaction from an external computing device;
determining, by the data replacement and communication engine, that the received request comprises sensitive data and one or more transient keys associated with a user;
monitoring, by the data replacement and communication engine, an unsecure gateway participation in securing sensitive data;
selecting, by the data replacement and communication engine, the unsecure gateway based on the monitoring;
facilitating, by the data replacement and communication engine, performance of the financial transaction as a secure transaction using the selected unsecure gateway;
replacing, by the data replacement and communication engine, based on the one or more transient keys, the sensitive data with substitute data that is unique to the user in real-time before sending the financial transaction through the unsecure gateway, thereby securing the financial transaction;
communicating, by the data replacement and communication engine the financial transaction, including the substitute data, to a gateway adapter;
receiving, by the gateway adapter, the communicated financial transaction including the substitute data;
determining, by the gateway adapter, that the substitute data is communicated in lieu of the sensitive data;
generating, by the gateway adapter, a file for the unsecure gateway; and
converting, by the gateway adapter, the substitute data into the sensitive data.

8. The database system of claim 7, wherein the operations further comprise:
prior to replacing the sensitive data into the substitute data, storing the sensitive data at a secure store instance of the transaction platform in communication with the gateway, the gateway adapter, and the external computing device including a client device; and
upon converting the substitute data into the sensitive data, deleting the sensitive data from the secure store instance of the transaction platform.

9. The database system of claim 7, wherein the operations further comprise communicating the file to the gateway, wherein the gateway to further facilitate and complete the financial transaction.

10. The database system of claim 7, wherein the request further comprises non-sensitive data in addition the sensitive data and the one or more transient keys, wherein the sensitive data includes personal data relating to the user, wherein the personal data includes one or more of a birthdate, a social security number, a credit card number, a card verification value, a debit card number, a gift card number, and bank account information.

11. The database system of claim 7, wherein the operations further comprise:
integrating the gateway adapter into the transaction platform, wherein the transaction platform is cloud-based and includes a pluggable architecture for integration of one or more entities including the gateway adapters having the gateway adapter; and
facilitating communication between the transaction platform, the gateway, the gateway adapter, and the external computing device via one or more application programming interfaces (APIs) offered by the transaction platform.

12. The database system of claim 7, wherein the substitute data comprises one or more of codes, alpha-numeric patterns, characters, equations, and formulae, wherein the substitute data serves to represent the sensitive data without revealing the sensitive data to protect the sensitive data from unauthorized accesses and misuses throughout processing of the financial transaction.

13. A computer-readable medium comprising a plurality of instructions which, when executed by a computing device, cause the computing device to facilitate operations comprising:
receiving, by a data replacement and communication engine of a transaction platform, a request to facilitate a financial transaction from an external computing device;
determining, by the data replacement and communication engine, that the received request comprises sensitive data and one or more transient keys associated with a user;
monitoring, by the data replacement and communication engine, an unsecure gateway participation in securing sensitive data;
selecting, by the data replacement and communication engine, the unsecure gateway based on the monitoring;
facilitating, by the data replacement and communication engine, performance of the financial transaction as a secure transaction using the selected unsecure gateway;
replacing, by the data replacement and communication engine, based on the one or more transient keys, the sensitive data with substitute data that is unique to the user in real-time before sending the financial transaction through the unsecure gateway, thereby securing the financial transaction;
communicating, by the data replacement and communication engine the financial transaction, including the substitute data, to a gateway adapter;
receiving, by the gateway adapter, the communicated financial transaction including the substitute data;
determining, by the gateway adapter, that the substitute data is communicated in lieu of the sensitive data;
generating, by the gateway adapter, a file for the unsecure gateway; and
converting, by the gateway adapter, the substitute data into the sensitive data.

14. The computer-readable medium of claim 13, wherein the operations further comprise:
prior to replacing the sensitive data into the substitute data, storing the sensitive data at a secure store instance of a transaction platform in communication with the gateway, the gateway adapter, and the external computing device including a client device; and
upon converting the substitute data into the sensitive data, deleting the sensitive data from the secure store instance of the transaction platform.

15. The computer-readable medium of claim 13, wherein the operations further comprise communicating the file to the gateway, wherein the gateway to further facilitate and complete the financial transaction.

16. The computer-readable medium of claim 13, wherein the request further comprises non-sensitive data in addition the sensitive data and the one or more transient keys, wherein the sensitive data includes personal data relating to the user, wherein the personal data includes one or more of a birthdate, a social security number, a credit card number, a card verification value, a debit card number, a gift card number, and bank account information.

17. The computer-readable medium of claim 13, wherein the operations further comprise:
- integrating the gateway adapter into the transaction platform, wherein the transaction platform is cloud-based and includes a pluggable architecture for integration of one or more entities including a plurality of gateway adapters having the gateway adapter; and
- facilitating communication between transaction platform, the gateway, the gateway adapter, and the external computing device via one or more application programming interfaces (APIs) offered by the transaction platform.

18. The computer-readable medium of claim 13, wherein the substitute data comprises one or more of codes, alphanumeric patterns, characters, equations, and formulae, wherein the substitute data serves to represent the sensitive data without revealing the sensitive data to protect the sensitive data from unauthorized accesses and misuses throughout processing of the financial transaction.

\* \* \* \* \*